(12) United States Patent
Yamashita et al.

(10) Patent No.: US 9,749,396 B2
(45) Date of Patent: Aug. 29, 2017

(54) DATA PROCESSING METHOD

(71) Applicant: FUJITSU LIMITED, Kawasaki-shi, Kanagawa (JP)

(72) Inventors: Koichiro Yamashita, Hachioji (JP); Hiromasa Yamauchi, Usakos (NA); Takahisa Suzuki, Yokohama (JP); Koji Kurihara, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 258 days.

(21) Appl. No.: 14/090,430

(22) Filed: Nov. 26, 2013

(65) Prior Publication Data

US 2014/0164468 A1    Jun. 12, 2014

Related U.S. Application Data

(63) Continuation of application No. PCT/JP2011/062416, filed on May 30, 2011.

(51) Int. Cl.
*H04L 29/08* (2006.01)
*H04W 4/08* (2009.01)
*H04W 84/22* (2009.01)

(52) U.S. Cl.
CPC .............. *H04L 67/10* (2013.01); *H04W 4/08* (2013.01); *H04W 84/22* (2013.01)

(58) Field of Classification Search
CPC ......... H04L 41/00; H04L 43/00; H04L 51/00; H04L 61/00; H04L 65/00; H04L 67/00; H04L 69/00; H04L 67/10; H04L 1/0076; H04L 12/189; H04L 12/241; H04L 12/2415; H04L 12/2497; H04L 12/2838;

(Continued)

(56) References Cited

U.S. PATENT DOCUMENTS

| 7,729,313 B2 * | 6/2010 | Lee ..................... H04W 36/18 370/331 |
| RE43,930 E * | 1/2013 | Chun .................... H04L 5/023 370/208 |

(Continued)

FOREIGN PATENT DOCUMENTS

| JP | 2006-246090 | 9/2006 |
| JP | 2007-81542 | 3/2007 |
| JP | 2007-529953 | 10/2007 |

OTHER PUBLICATIONS

International Search Report mailed Aug. 16, 2011 in corresponding International Application No. PCT/JP2011/062416.

(Continued)

*Primary Examiner* — Wing F Chan
*Assistant Examiner* — Billy H Ng
(74) *Attorney, Agent, or Firm* — Staas & Halsey LLP

(57) ABSTRACT

A data processing method is executed by a first data processing apparatus, and includes setting based on a size of data that is for executing a predetermined function, a first division number for dividing the data; producing groups of a second division number, each including N (a positive integer) elements by dividing the first division number; assigning a plurality of data processing apparatuses each capable of communicating with the first data processing apparatus, to the groups of the second division number; and assigning sub-data formed by dividing the data by the first division number, to the groups of the second division number.

7 Claims, 9 Drawing Sheets

(58) Field of Classification Search
CPC ............. H04L 12/2874; H04L 12/2878; H04L 12/2896; H04L 12/40117; H04L 2209/603; H04L 2209/605; H04L 2209/606; H04L 2209/608; H04L 2463/062; H04L 25/02; H04L 25/42; H04L 25/44; H04L 25/45; H04L 27/2611; H04L 27/2643; H04L 29/06428; H04L 29/06455; H04L 29/06571; H04L 29/06721; H04L 29/06727; H04L 29/08135; H04L 29/08153; H04L 29/08414; H04L 29/08882; H04L 41/042; H04L 41/5096; H04L 45/44; H04L 47/525; H04L 47/783; H04L 49/1507; H04L 49/1561; H04L 5/0032; H04L 63/0218; H04L 63/062; H04L 63/064; H04L 65/4046; H04L 65/4076; H04L 67/1002; H04L 67/1065; H04L 67/1097; H04L 9/08; H04L 9/0802; H04L 9/0819; H04L 9/083; H04L 9/3268; H04L 13/12; H04L 13/14; H04L 2209/601; H04L 13/10; H04L 2209/60; H04W 4/08; H04W 84/22; H04W 84/005

See application file for complete search history.

(56) References Cited

U.S. PATENT DOCUMENTS

| | | | | |
|---|---|---|---|---|
| 2005/0207385 A1* | 9/2005 | Gorokhov | ............. | H04L 5/0037 370/344 |
| 2006/0003767 A1* | 1/2006 | Kim | ...................... | H04W 36/18 455/436 |
| 2006/0009224 A1* | 1/2006 | Lim | ...................... | H04W 28/26 455/442 |
| 2006/0135164 A1* | 6/2006 | Kim | .................... | H04W 72/048 455/436 |
| 2008/0291861 A1* | 11/2008 | Yang | ...................... | H04L 12/189 370/312 |

OTHER PUBLICATIONS

PCT International Preliminary Report on Patentability mailed Dec. 12, 2013 in corresponding International Patent Application No. PCT/JP2011/062416.

* cited by examiner

DATA PROCESSING METHOD

CROSS REFERENCE TO RELATED APPLICATIONS

This application is a continuation application of International Application PCT/JP2011/062416, filed on May 30, 2011 and designating the U.S., the entire contents of which are incorporated herein by reference.

FIELD

The embodiments discussed herein are related to a data processing method.

BACKGROUND

According to a conventional system, plural terminals each execute transmission and reception when the terminals are present in an area enabling the terminals to mutually receive data; each terminal transfers a portion of data that is to be distributed and not retained by the terminal, from a counterpart terminal thereto and retains the portion; the terminal repeats this transfer also with the other terminals; and thereby, the terminal acquires the overall data to be distributed. According to another system, terminals are classified into positional groups; distribution groups are formed from information concerning the positional groups and station distribution performance data; and data distribution is executed at distribution intervals set in advance for each distribution group in a time slot set in advance (see, e.g., Japanese Laid-Open Patent Publication Nos. 2007-81542 and 2006-246090).

However, according to the conventional techniques, when the terminals move, the density of the terminals dynamically varies and therefore, a problem arises in that it is difficult for each of the terminals to acquire all of the necessary data by data transfers among the terminals and data distribution in each group.

SUMMARY

According to an aspect of an embodiment, a data processing method is executed by a first data processing apparatus and includes setting based on a size of data that is for executing a predetermined function, a first division number for dividing the data; producing groups of a second division number, each including N (a positive integer) elements by dividing the first division number; assigning plural data processing apparatuses each capable of communicating with the first data processing apparatus, to the groups of the second division number; and assigning sub-data formed by dividing the data by the first division number, to the groups of the second division number.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of a data processing method will be described in detail with reference to the accompanying drawings. According to the data processing method according to the embodiments, data to execute a predetermined function is divided by a first division number; and the resulting sub-data formed by division by the first division number are assigned to groups of a second division number to which plural data processing apparatuses are assigned. The present invention is not limited to the embodiments.

Figure 1:
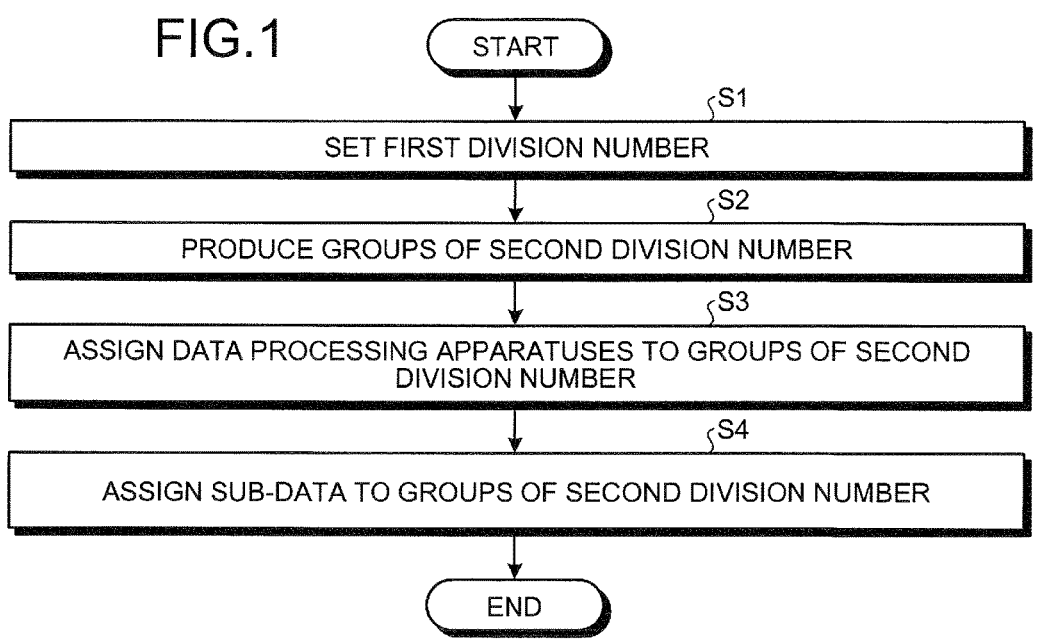
FIG. 1 is a flowchart of a data processing method according to a first embodiment.

FIG. 1 is a flowchart of the data processing method according to a first embodiment. As depicted in FIG. 1, when a first data processing apparatus starts the data processing method, the first data processing apparatus sets the first division number (step S1). The "first division number" is set based on the size of the data and is the number used to divide the data that is for executing a predetermined function.

The first data processing apparatus produces groups of the second division number (step S2). Each of the groups includes N elements (N is a positive integer), obtained by division by the first division number.

The first data processing apparatus assigns data processing apparatuses to the groups of the second division number (step S3). The data processing apparatuses can each communicate with the first data processing apparatus.

The first data processing apparatus assigns the sub-data to the groups of the second division number (step S4). The sub-data are formed by dividing the data that is for executing a predetermined function, by the first division number.

According to the first embodiment, the data processing apparatuses are divided into groups; the sub-data are assigned to the groups; and thereby, the plural data processing apparatuses can each acquire all of the necessary data.

A second embodiment is an embodiment in a case where the data processing method according to the first embodiment is applied to a mobile telephone system that includes terminals such as mobile telephones as the data processing apparatuses and a base station as the first data processing apparatus. An example of the data that is for executing a predetermined function may be, for example, data correlated with a geographical area.

The second embodiment is a data processing method used when the plural terminals each download data correlated with the geographical area from a service server supplying the data via the base station. An example of data correlated with a geographical area may be, for example, map data, or data such as information concerning stores and services for a respective geographical area. An example of the terminal may be a mobile information terminal such as a mobile gaming machine or a personal digital assistant (PDA) that can communicate by radio, in addition to the mobile telephone.

Figure 2:
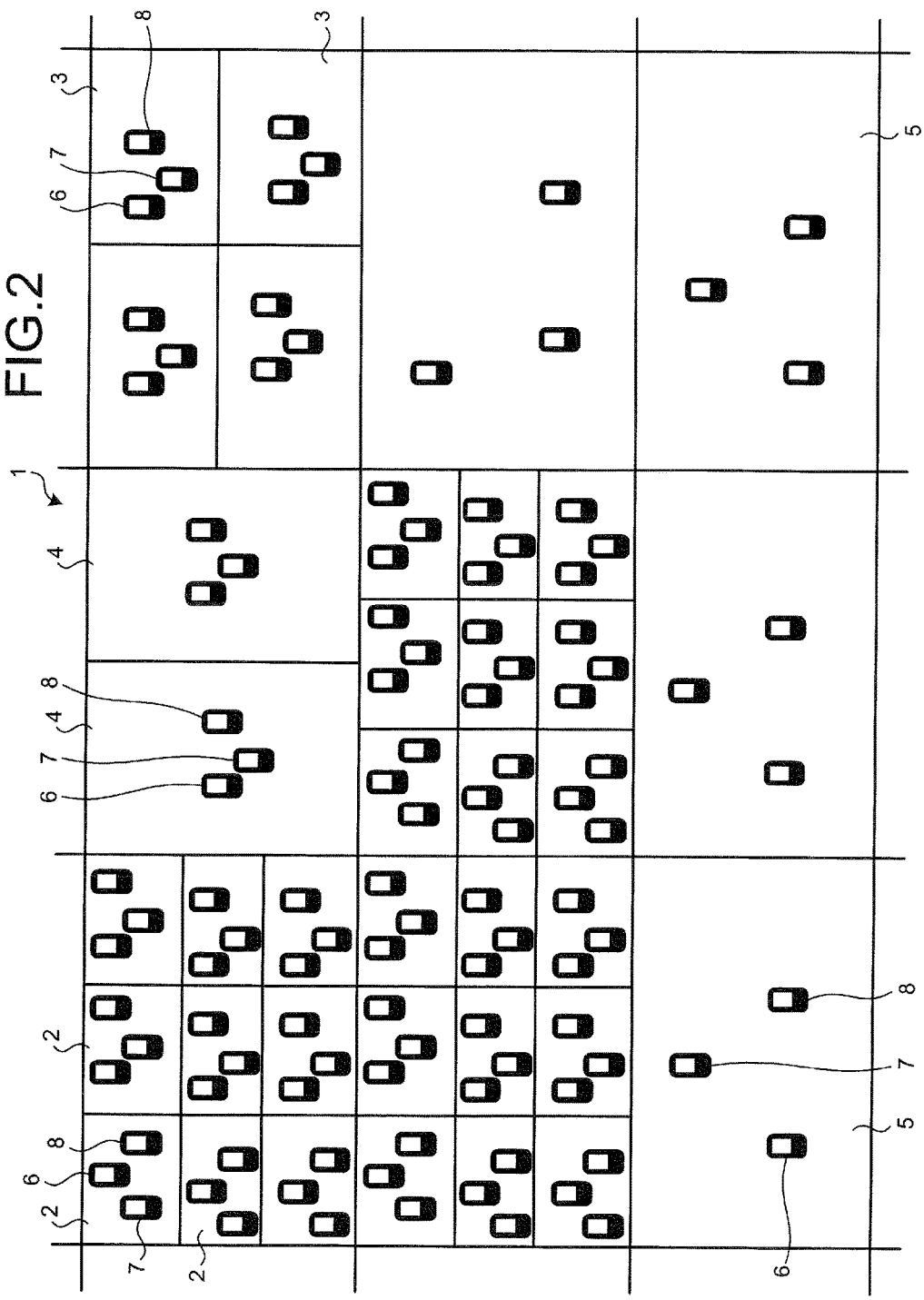
FIG. 2 is an explanatory schematic diagram of the data processing method according to a second embodiment.

FIG. 2 is an explanatory schematic diagram of the data processing method according to the second embodiment. As depicted in FIG. 2, a supply area 1 of the data correlated with the geographical area is an area in which the same data is supplied. Plural terminals located in the supply area 1 of the data correlated with the geographical area can communicate with a base station (not depicted) and are divided into plural groups.

Each of the groups includes terminals having access privilege to a service server and terminals having no such access privilege. The terminals having access privilege to access the service server, each download the data correlated with the geographical area from the service server via the base station. The terminals having no such access privilege do not download the data correlated with the geographical area from the service server via the base station. In each of the groups, the number of terminals 6, 7, and 8 each having the access privilege to access the service server is equal to that of each other.

On the other hand, the supply area 1 of the data correlated with the geographical area is divided into plural clusters 2, 3, 4, and 5. The terminals belonging to each of the groups are located in any one of the clusters 2, 3, 4, and 5 for each group.

In the example depicted in FIG. 2, the three terminals 6, 7, and 8 each having the access privilege to access the service server are included in each of the clusters 2, 3, 4, and 5. In each of the clusters 2, 3, 4, and 5, the terminals having no such access privilege are not depicted. In this manner, the cluster is determined based on the number of the terminals 6, 7, and 8 having the access privilege to access the service server regardless of the size of the cluster and the locations of the terminals therein.

The data correlated with the geographical area is divided by the number of terminals 6, 7, and 8 each having the access privilege to access the service server in each of the clusters 2, 3, 4, and 5. The sub-data formed by dividing the original data are downloaded and shared by the terminals 6, 7, and 8 that each has the access privilege to access the service server in each of the clusters 2, 3, 4, and 5.

In the example depicted in FIG. 2, the original data correlated with the geographical area is divided into three sub-data that are a first, a second, and a third sub-data. In each of the clusters 2, 3, 4, and 5, the terminals 6, 7, and 8 each has the access privilege to access the service server download the first, the second, the third sub-data, respectively.

In each of the clusters 2, 3, 4, and 5, each of the terminals belonging thereto mutually transfers the sub-data retained by the terminal to the other terminals by, for example, ad hoc data communication. Thereby, each of the terminals belonging to each of the clusters 2, 3, 4, and 5 can acquire all of the original data correlated with the geographical area.

Figure 3:
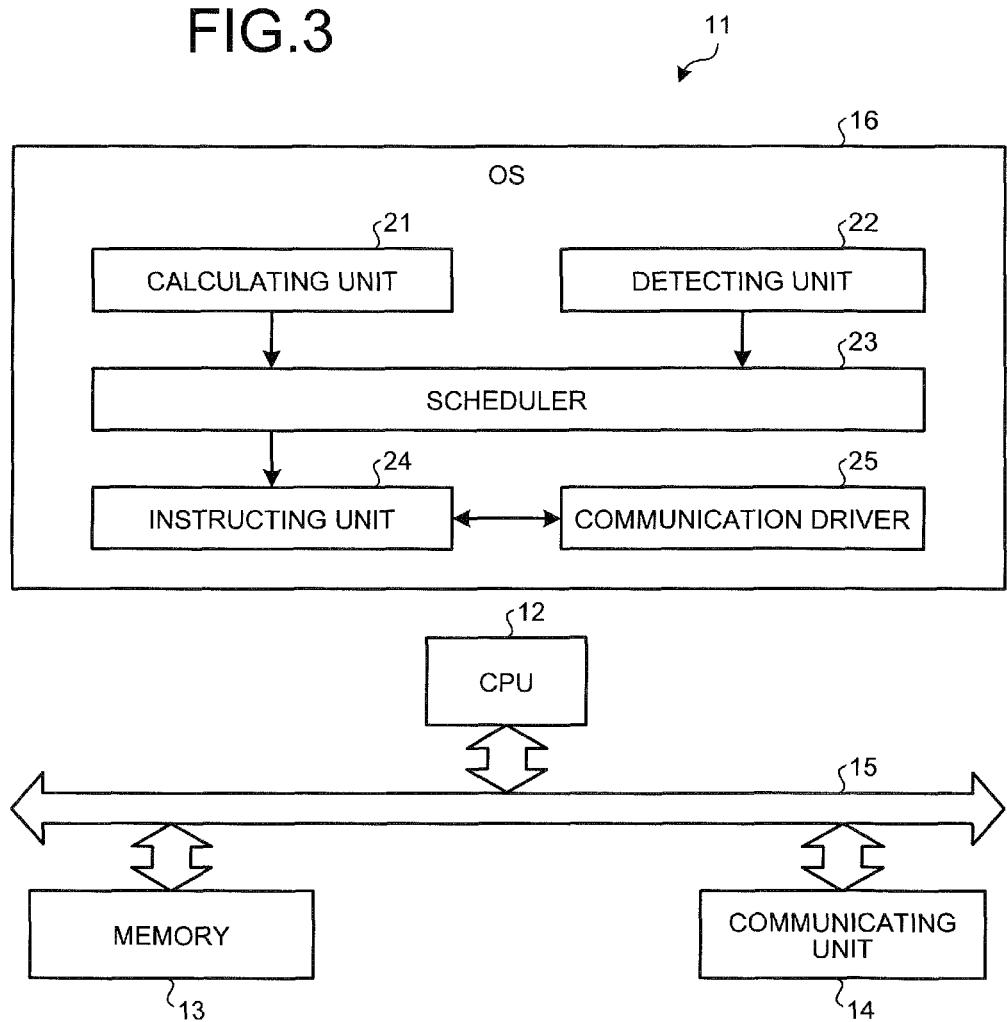
FIG. 3 is a block diagram of a base station according to the second embodiment.

FIG. 3 is a block diagram of the base station according to the second embodiment. As depicted in FIG. 3, the base station 11 includes, for example, a central processing unit (CPU) 12, memory 13, and a communicating unit 14. The CPU 12, the memory 13, and the communicating unit 14 are connected to a bus 15.

The CPU 12 executes an operating system (OS) 16 and various application programs. The CPU 12 executes the OS 16 and thereby, for example, a calculating unit 21, a detecting unit 22, a scheduler 23, an instructing unit 24, and a communication driver 25 are realized.

The calculating unit 21 calculates the division number such that the data correlated with the geographical area can be divided into sub-data each having a size enabling download by the terminal at the effective maximal speed from the service server via the base station. The effective maximal speed for the terminal to download the data is determined based on factors such as the communication environment and therefore, the division number becomes greater as the size of the original data before the division becomes larger, and the division number becomes smaller as the size of the original data becomes smaller.

The detecting unit 22 collects a motion vector of each terminal connected to the base station by radio communication and detects the movement of the terminal based on the motion vector. The detecting unit 22 monitors entrance and exit of the terminal into/from the supply area 1 of the data correlated with the geographical area, based on the positional relation between the terminal and the coordinates on a map that are bound to the data correlated with the geographical area. The detecting unit 22 monitors entrance and exit of the terminal into/from a communicable area (for example, a cell) of the base station.

In each of the clusters 2, 3, 4, and 5, the scheduler 23 selects the terminals whose signal strength is high in the radio communication thereof with the base station or the terminals whose communication quality is excellent for the number corresponding to the division number calculated by the calculating unit 21; grants to each of the selected terminals, the access privilege to access the service server; selects the terminals to which no access privilege to access the service server is granted; and forms groups each including terminals to which the access privilege to access to the service server is granted and terminals to which no such access privilege is granted. Each of the groups is an aggregate of the terminals each transferring data retained thereby to the other terminals after the downloading comes to an end by each of the terminals 6, 7, and 8 having the access privilege to access the service server.

When the terminals move among the clusters 2, 3, 4, and 5 and thereby, the configuration of each of the clusters varies, the scheduler 23 may select terminals to newly grant the access privilege to. The same may be applied to cases where the terminals enter and exit the supply area 1 of the data correlated with the geographical area, where a terminal that is off-line in the supply area 1 of the data correlated with the geographical area becomes on-line and vice versa, and where the terminals enter and exit the area for the base station to be communicable.

For example, when the terminals 6, 7, and 8 each having the access privilege to access the service server exit the cluster having the terminals 6, 7, and 8 currently located therein, the scheduler 23 may deprive the terminals 6, 7, and 8 of the access privileges to access the service server granted thereto after the terminals 6, 7, and 8 complete the downloading that is under execution thereby. In this case, the other terminals located in the cluster having the terminals 6, 7, and 8 located therein may acquire the sub-data downloaded by the terminals 6, 7, and 8 from the terminals 6, 7, and 8.

When a terminal having no access privilege to access the service server exits the cluster currently having the terminal located therein, the scheduler 23 may notify the terminal of the terminals 6, 7, and 8 each having the access privilege to access the service server that are located in the cluster that is the destination of the terminal.

On the other hand, in a case where the terminals 6, 7, and 8 each having the access privilege to access the service server exit the communicable area of the base station from the cluster currently having the terminals 6, 7, and 8 located therein, the scheduler 23 may deprive the terminals 6, 7, and 8 of the access privileges to access the service server even if the downloading has not yet come to an end. In this case, the scheduler 23 may newly grant the access privilege to access the service server to another terminal whose signal strength is high or the terminal whose communication quality is excellent among the other terminals located in the cluster having the terminal located therein, and may instruct the other terminal to again execute the downloading.

The instructing unit 24 instructs the terminals located in the clusters 2, 3, 4, and 5 to mutually transfer sub-data thereamong in each of the clusters after the downloading by each of the terminals 6, 7, and 8 having the access privilege to access the services server comes to an end. In this case, the instructing unit 24 instructs which one of the terminals 6, 7, 8 each having the access privilege to access the services server retains which sub-data. The instructing unit 24 instructs the terminals to execute the data transfer not by using a network such as the mobile telephone network but by using ad hoc data communication.

The communication driver 25 controls the communicating unit 14. The memory 13 is used as, for example, a work area for the CPU 12. The communicating unit 14 is connected to the mobile telephone network by radio communication and transmits and receives, for example, packets with the terminals.

Figure 4:
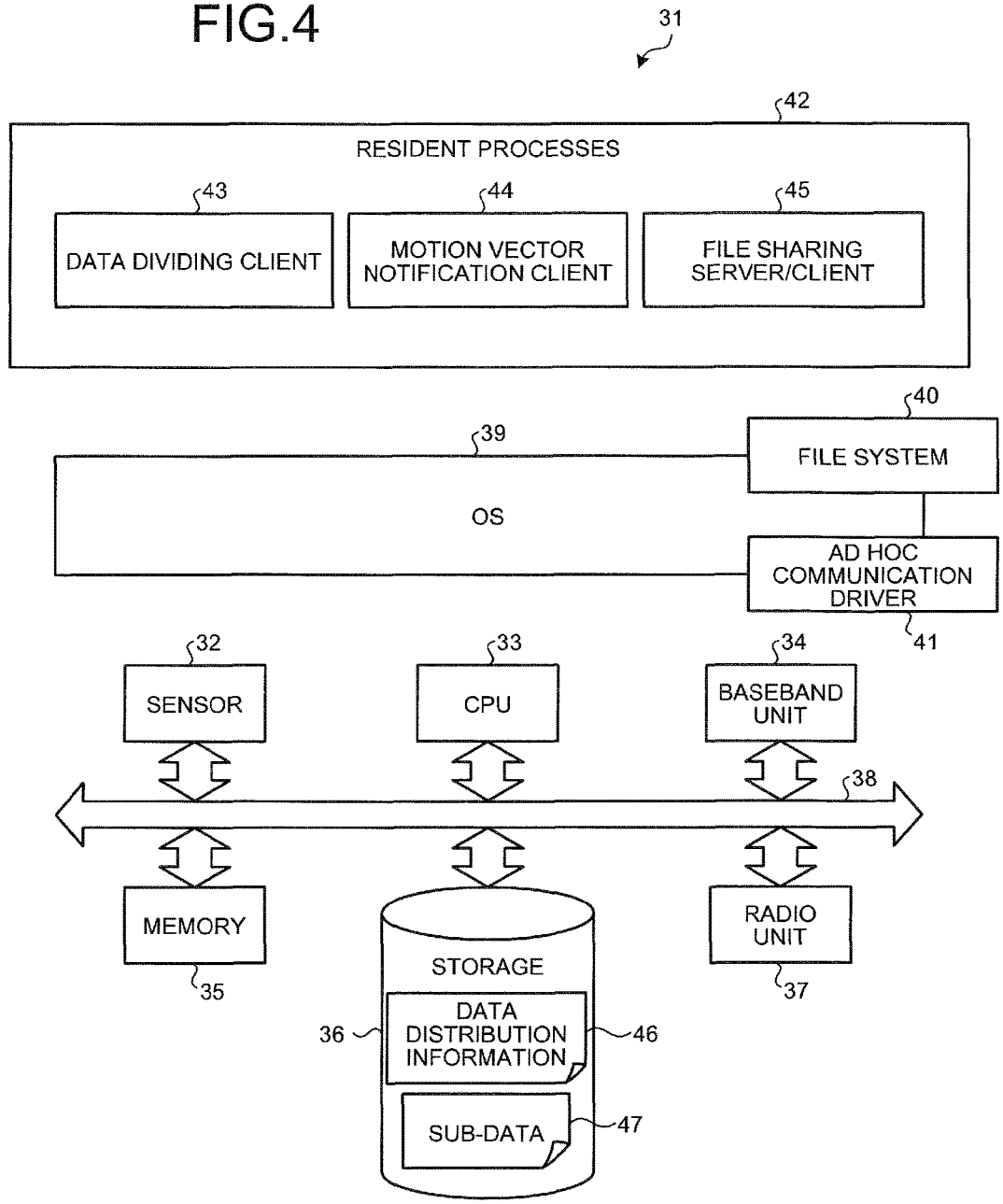
FIG. 4 is a block diagram of a terminal according to the second embodiment.

FIG. 4 is a block diagram of the terminal according to the second embodiment. As depicted in FIG. 4, a terminal 31 includes, for example, a sensor 32, a CPU 33, a baseband unit 34, memory 35, storage 36, and a radio unit 37. The units from the sensor 32 to the radio unit 37 are connected to a bus 38.

The CPU 33 executes an OS 39 and various application programs. The execution of the OS 39 by the CPU 33 implements, for example, a file system 40; an ad hoc communication driver 41; and, for example, a data dividing client 43, a motion vector notification client 44, and a file sharing server/client 45 as resident processes 42.

The data dividing client 43 implements a client function executed when the data correlated with the geographical area is acquired, for the base station. The data dividing client 43 acquires data distribution information 46 from the base station 11 and, when the clusters are reconfigured consequent to the movement of the terminals, the data dividing client 43 updates the data distribution information 46.

The data distribution information 46 is information indicating which terminal retains which sub-data (sub-data) 47 among the data correlated with the geographical area. The data distribution information 46 may be information including, for example, an identifier of a terminal and an offset of the data retained by the terminal as a combination for each terminal. The identifier of the terminal may be, for example, an Internet Protocol (IP) address.

The motion vector notification client 44 calculates the motion vector of the terminal 31 based on the position information of the terminal 31 acquired by the sensor 32 and notifies the base station 11 of the motion vector. The file sharing server/client 45 implements a server function of supplying data retained by the terminal 31 to the other terminals and a client function of acquiring data from the other terminals.

The file system 40 manages the data stored in the storage 36. The ad hoc communication driver 41 controls the ad hoc data communication to transfer data among the terminals.

The sensor 32 acquires position information of the terminal 31. An example of the sensor 32 may be, for example, a global positioning system (GPS) sensor or an acceleration sensor. The baseband unit 34 executes a transmission process and a reception process for a baseband signal. The memory 35 is used as, for example, a work area for the CPU 33.

The storage 36 may correlate and store the data distribution information 46 acquired by the terminal 31 from the base station 11 and the sub-data (sub-data) 47 of the data and the geographical area downloaded by the terminal 31 from the service server via the base station 11. The radio unit 37 is connected to the mobile telephone network by radio communication and transmits and receives, for example, packets to/from the base station 11, and also transmits and receives, for example, packets to/from the other terminals by the ad hoc data communication.

Figure 5:
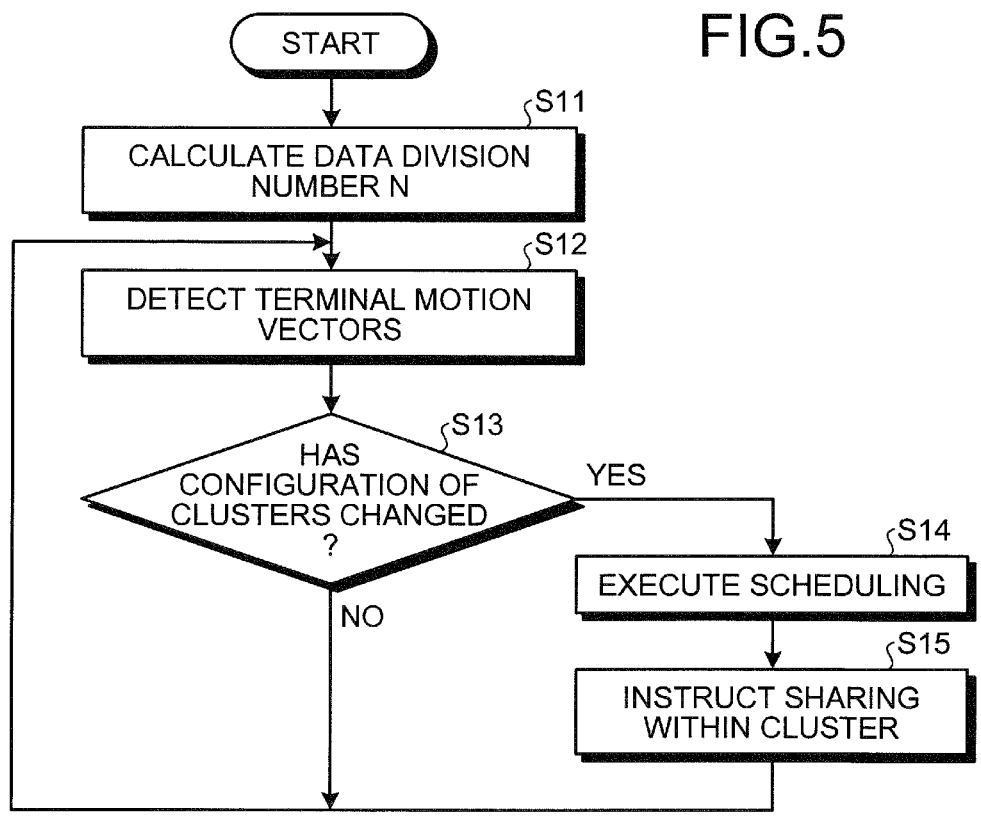
FIG. 5 is a flowchart of the data processing method executed by the base station according to the second embodiment.

FIG. 5 is a flowchart of the data processing method executed by the base station according to the second embodiment. As depicted in FIG. 5, using the calculating unit 21, the base station 11 calculates the division number N (data division number N) of the data correlated with the geographical area based on the size of the data correlated with the geographical area supplied by the service server, and the effective maximal speed for the terminal to download the data (step S11).

Using the detecting unit 22, the base station 11 collects motion vectors of the terminals connected to the base station 11 by the radio communication in a handshake state and detects the movement of the terminals based on the motion vectors (step S12). Using the scheduler 23, the base station 11 determines whether the configuration of the clusters 2, 3, 4, and 5 has changed due to entrance or exit of each of the terminals and powering on or off of the terminals in the clusters 2, 3, 4, and 5 included in the supply area 1 of the data correlated with the geographical area (step S13).

If the base station 11 determines that the configuration of the clusters has not changed (step S13: NO), the process step returns to step S12. If the base station 11 determines that the configuration of the clusters has changed (step S13: YES), the base station 11 executes scheduling of the terminals using the scheduler 23 and assigns terminals having the access privilege to access the service server and terminals having no such access privilege to each of the clusters (step S14).

Using the instructing unit 24, the base station 11 instructs the terminals to mutually transfer data among the terminals in the cluster and to share the data (step S15). The process step returns to step S12. When the data division number N exceeds the number of terminals connected to the base station 11 in the handshake state, the base station 11 does not execute the operation of the flowchart depicted in FIG. 5.

Figure 6:
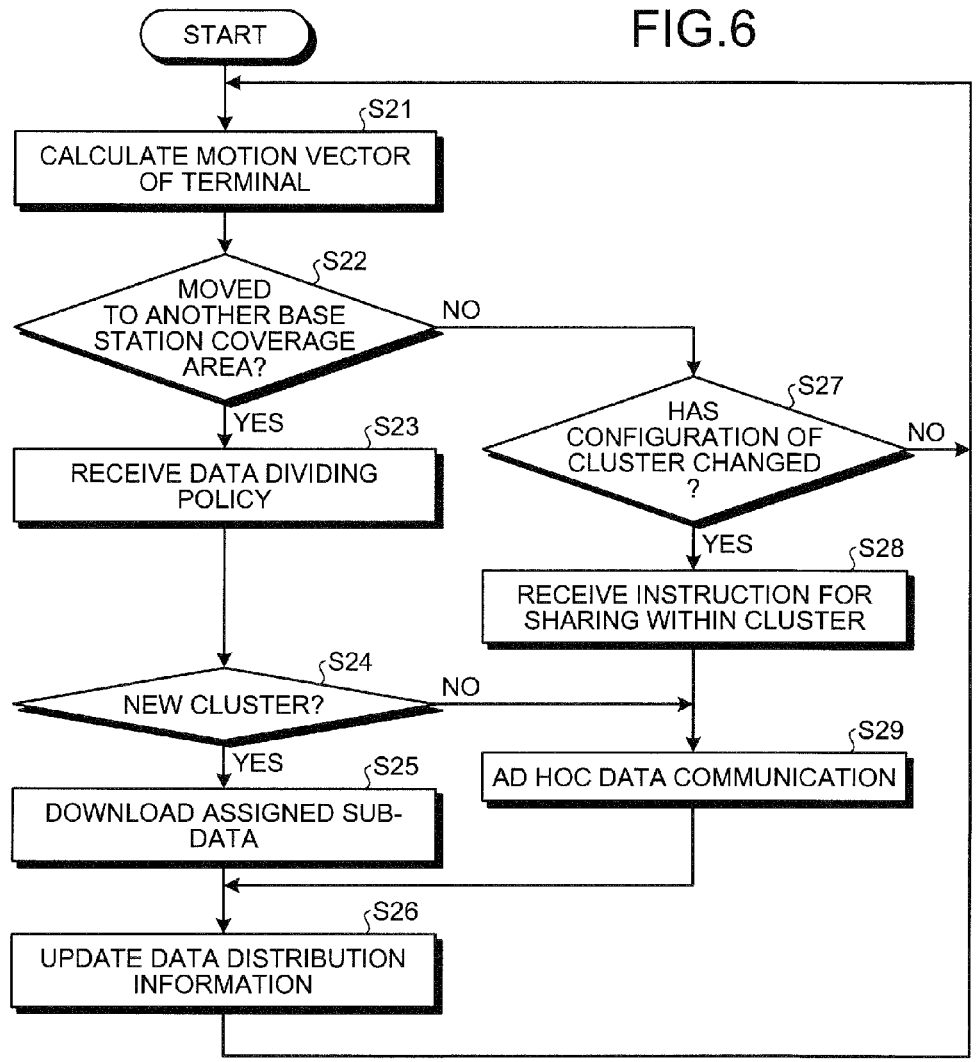
FIG. 6 is a flowchart of the data processing method executed when a terminal is started up and when the terminal moves, according to the second embodiment.

FIG. 6 is a flowchart of the data processing method executed when a terminal is started up and when the terminal moves, according to the second embodiment. As depicted in FIG. 6, the terminal 31 calculates the motion vector of the terminal 31 using the motion vector notification client 44, based on the position information acquired by the sensor 32 and reports the motion vector to base station (step S21).

The terminal 31 determines whether the terminal 31 has moved from the base station coverage area currently having the terminal 31 located therein to another base station coverage area (step S22). If the terminal 31 determines that the terminal 31 has moved to the other base station coverage area (step S22: YES), the terminal 31 receives from the base station of the destination, a data dividing policy of the base station (step S23) and determines whether the cluster of the destination is a new cluster based on the data dividing policy (step S24).

If the terminal 31 determines that the cluster is a new cluster (step S24: YES), the terminal 31 downloads the sub-data 47 of the data correlated with the geographical area and assigned to the terminal 31 in the cluster of the destination (step S25). On the other hand, if the terminal 31 determines that the cluster is not a new cluster (step S24: NO), the terminal 31 receives the data from another terminal in the cluster by the ad hoc data communication (step S29). When the downloading of the sub-data or the reception of the data by the ad hoc data communication comes to an end, the terminal 31 updates the data distribution information 46 (step S26) and the process step returns to step S21.

On the other hand, if the terminal 31 determines that the terminal 31 has not moved to the coverage area of another base station (step S22: NO), the terminal 31 determines whether the configuration of the cluster has changed (step S27). If the terminal 31 determines that the configuration of the cluster has not changed (step S27: NO), the process step returns to step S21 (that is, the terminal 31 executes no operation).

If the terminal 31 determines that the configuration of the cluster has changed (step S27: YES), the terminal 31 receives from the base station, an instruction for the terminals in the cluster to mutually transfer data thereamong and thereby, to share the data (step S28), receives the data from other terminals in the cluster by the ad hoc data communication (step S29), updates the data distribution information 46 (step S26), and returns to the process at step S21.

Figure 7:
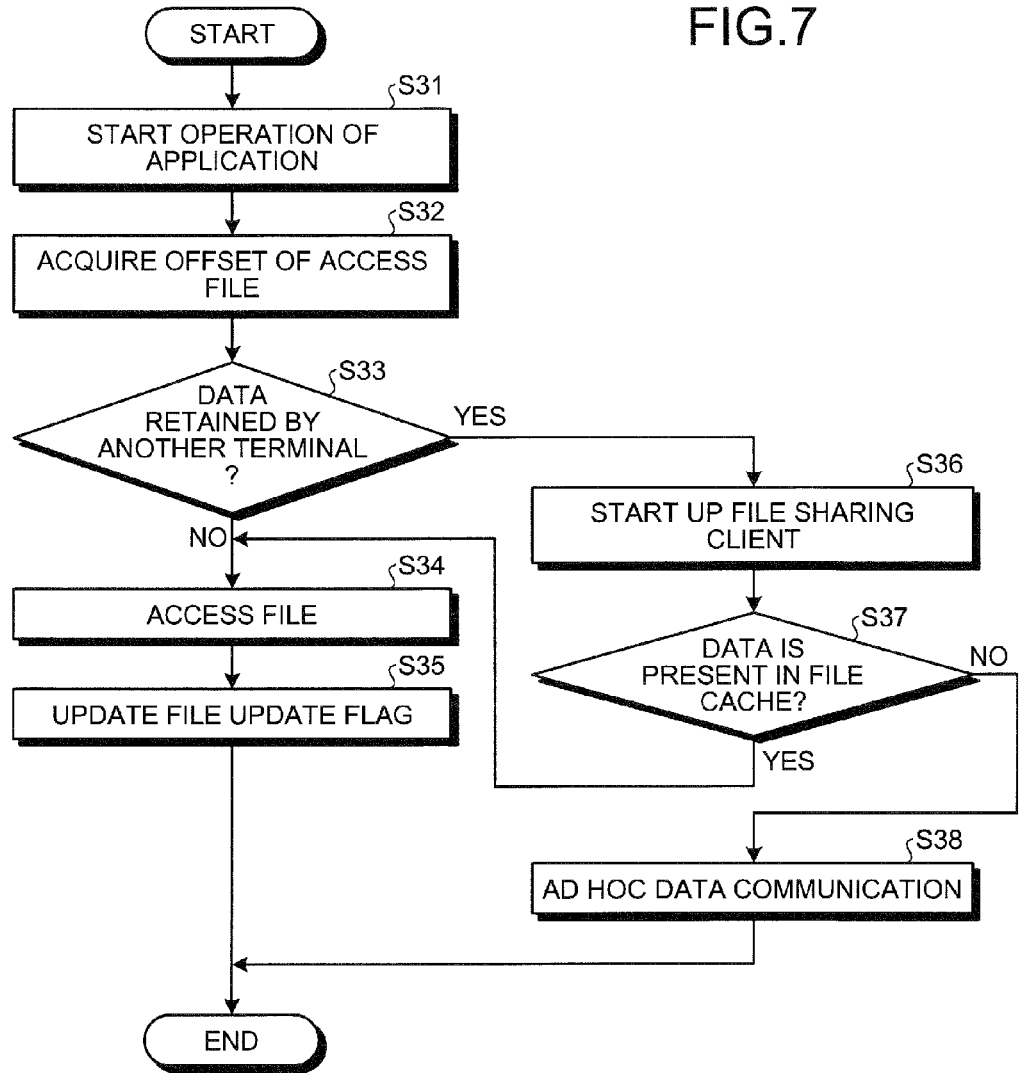
FIG. 7 is a flowchart of the data processing method executed when an application of a client terminal is operated, according to the second embodiment.
Figure 8:
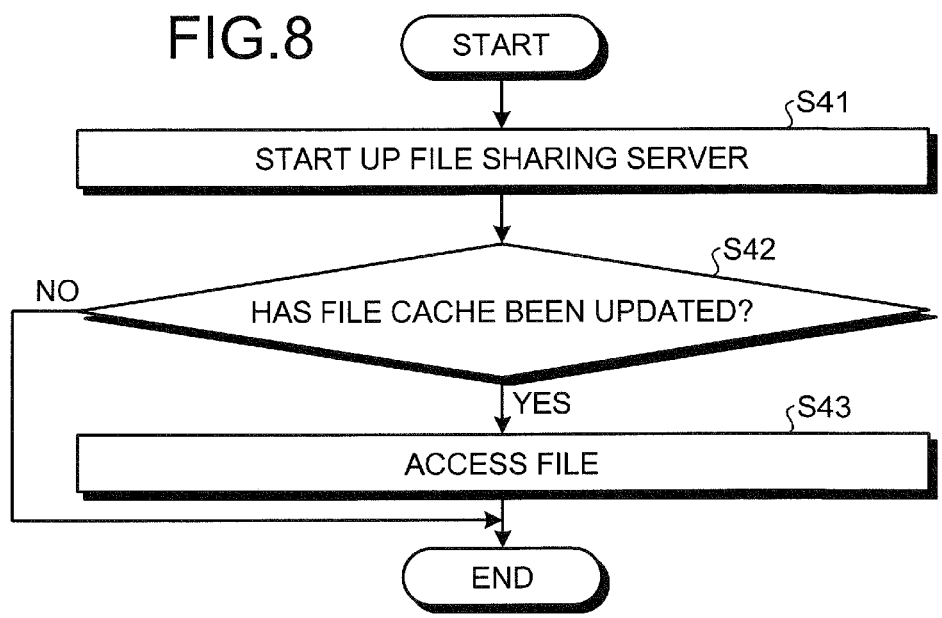
FIG. 8 is a flowchart of the data processing method executed when an application of a server terminal is operated, according to the second embodiment.

FIG. 7 is a flowchart of the data processing method executed when an application of a client terminal is operated, according to the second embodiment. FIG. 8 is a flowchart of the data processing method executed when an application of a server terminal is operated, according to the second embodiment.

As depicted in FIG. 7, when the terminal 31 starts operation of an application that uses the data correlated with the geographical area (step S31), the terminal 31 refers to the data distribution information 46, acquires the offset of the file to be accessed (step S32), refers to the data distribution information 46, and determines whether the data desired by the terminal 31 is stored in the storage 36 of the terminal 31 or is data retained by another terminal, based on the information concerning the offset of the file to be accessed (step S33).

If the terminal 31 determines that the data is the data retained by the terminal 31 (step S33: NO), the terminal 31 accesses a file that includes the desired data and is stored in the storage 36 of the terminal 31 (step S34), and updates a file update flag using the file system 40 (step S35).

On the other hand, if the terminal 31 determines that the data is data retained by another terminal (step S33: YES), the terminal 31 starts up the client function of the file sharing server/client 45 (step S36) and determines whether the desired data is present in a file cache of the terminal 31 (step S37). Because, originally, even in a case where the desired data is the data retained by another terminal, for example, when the terminal 31 accessed the data retained by the other terminal in the past, the desired data may remain in the file cache of the terminal 31.

On the other hand, for the other terminal, as depicted in FIG. 8, the server function of the file sharing server/client 45 is started up (step S41). When the client function is started up (in FIG. 7, step S36) in the terminal 31 and the server function is started up in the other terminal, the server terminal determines whether the data in the file cache of the server terminal has been updated (step S42). If the server terminal determines that the data in the file cache of the server terminal has not been updated (step S42: NO), the server terminal causes the server function to discontinue without executing any operation. In this case, the server terminal notifies the client terminal 31 that the data in the file cache has not been updated.

If the client terminal 31 receives notification that the desired data is present in the file cache of the client terminal 31 and the data in the file cache has not been updated by the server terminal (step S37: YES), the client terminal 31 accesses the file that includes the desired data present in the file cache of the client terminal 31 as depicted in FIG. 7 (step S34) and updates the file update flag using the file system 40 (step S35).

On the other hand, if the server terminal determines that the data in the file cache of the server terminal has been updated (step S42: YES), the server terminal accesses the file that includes the desired data stored in the storage 36 of the server terminal as depicted in FIG. 8 (step S43) and notifies the client terminal 31 that the data in the file cache has been updated.

If the client terminal 31 determines that the desired data is not present in a file cache of the client terminal 31 (step S37: NO), the client terminal 31 receives the desired data from the server terminal by the ad hoc data communication as depicted in FIG. 7 (step S38). If the client terminal 31 determines that the desired data is present in the file cache of the client terminal 31 while the client terminal 31 receives from the server terminal notification that the data in the file cache has been updated, the client terminal 31 also receives the desired data from the server terminal by the ad hoc data communication (step S38).

Figure 9:
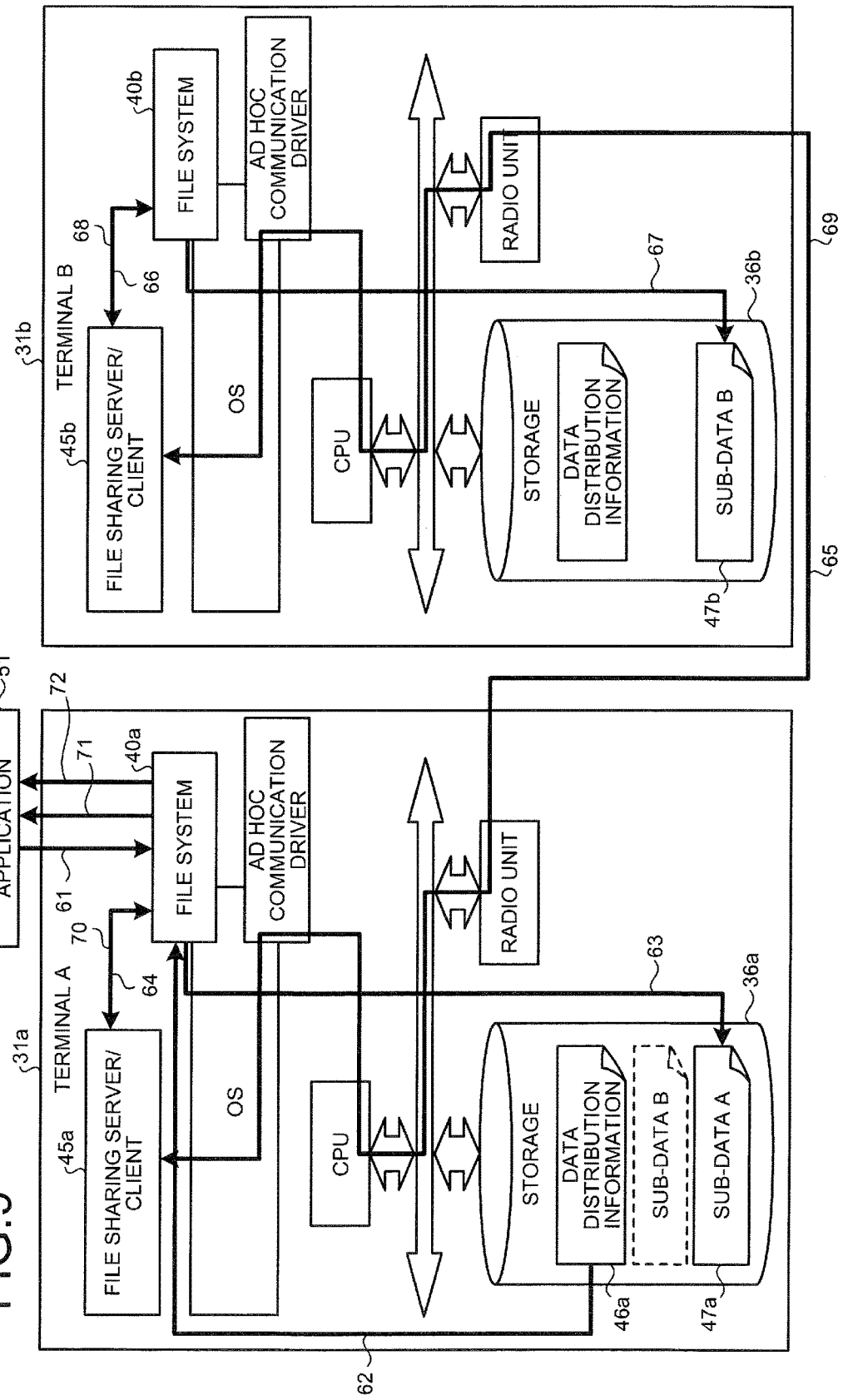
FIG. 9 is an explanatory schematic diagram of data transfer between terminals, according to the second embodiment.

FIG. 9 is an explanatory schematic diagram of the data transfer between the terminals, according to the second embodiment. As depicted in FIG. 9, when an application 51 is started up that uses the data correlated with the geographical area in a terminal A31a, the application 51 issues an access request to the terminal A31a as indicated by an arrow 61. Thereby, the terminal A31a checks data distribution information 46a retained by the terminal A31a using a file system 40a of the terminal A31a as indicated by an arrow 62.

The terminal A31a acquires sub-data 47a from storage 36a of the terminal A31a for the sub-data 47a retained by the terminal A31a as indicated by an arrow 63. On the other hand, for sub-data 47b retained by another terminal B31b, the terminal A31a starts up a client function of a file sharing server/client 45a of the terminal A31a as indicated by an arrow 64. Using the client function of the file sharing server/client 45a, the terminal A31a issues an access request to the terminal B31b by ad hoc communication as indicated by an arrow 65.

The terminal B31b starts up a server function of a file sharing server/client 45b of the terminal B31b in response to the access request from the terminal A31a. The terminal B31b accesses storage 36b of the terminal B31b using a file system 40b of the terminal B31b and acquires the sub-data 47b as indicated by arrows 66 and 67. The terminal B31b sends the sub-data 47b to the terminal A31a as a response to the access request from the terminal A31a, using the server function of the file sharing server/client 45b as indicated by arrows 68 and 69.

The terminal A31a receives the sub-data 47b sent from the terminal B31b, using the client function of the file sharing server/client 45a; returns the sub-data 47b acquired from the terminal B31b to the application 51, using the file system 40a of the terminal A31a as indicated by arrows 70 and 71; and returns the sub-data 47a retained by the terminal A31a to the application 51, using the file system 40a of the terminal A31a as indicated by an arrow 72.

Description will be made using specific values. As an example, the following conditions concerning the data size, the communication environment, and the number of terminals are assumed. The size of the data correlated with the geographic area is 100 [Mbit]. The downloading time period to be secured is five [sec]. The time period consumed for updating executed when the terminal moves between the clusters is five [sec]. The maximal effective band is five [Mbps]. The number of terminals each capable of securing the maximal effective band is 20. The number of terminals present in the supply area 1 of the data correlated with the geographical area is 50. The band used when the 50 terminals are connected to the base station is one [Mbps]. The access speed to a remote file is one [Mbps].

Because the downloading time period to be secured is five [sec], the maximal file size downloadable using the maximal effective band of 5 [Mbps] in this five [sec] is 25 [Mbit]. Therefore, when data of 100 [Mbit] is divided into four or more sub-data, the demand concerning the downloading can be satisfied. For the number of terminals of 50, the relation between the number of clusters X and the division number N in the cluster is "50≥X·N≥4". "X" and "N" are each a positive integer and therefore, the combinations of X and N satisfying "50≥X·N≥4" are as below.

For X that is X=1, N can take 46 values from four to 50; for X that is X=2, N can take 23 values from two to 25; for X that is X=3, N can take 14 values from two to 16; . . . ; for X that is X=25, N can take two values of one and two; for X that is X=26, N can take one value of one; . . . ; and, for X that is X=50, N can take one value of one. Therefore, there are 193 combinations in total.

In the above, because the time period necessary for the update executed when the terminals move among the clusters is five [sec] and the speed to access the remote file is one [Mbps], the data size allowed for the data updating is five [Mbit] at the maximum. Therefore, the division number satisfying the requirements is dividing the data of 100 [Mbit] into 20 sub-data. In this case, the optimal solution is N=5 for X that is X=4 or N=4 for X that is X=5 and therefore, when X is X=4, a cluster is formed that is configured by seven (or eight) terminals and when X is X=3, a cluster is formed that is configured by 10 terminals.

Any one of the combinations may be selected. However, for example, the above combinations may be verified and the division number may be determined based on a solution that is found soonest. This process of determining the division number is determined based on the size of the data correlated with the geographical area and therefore, one determination session alone is executed for one service.

The description will be made taking an example of the case where the X is X=3. When the division of the cluster is determined and the system starts operation, for example, a terminal whose radio strength is high downloads the sub-data as a terminal having the access privilege to access the service server, among the plural terminals belonging to each cluster. Complying with the condition in this case, each of the terminals each having the access privilege to access the service server completes downloading in five [sec]. In each cluster, the sub-data are distributed to the plural terminals.

The base station knows which sub-data is assigned to which terminal. For example, it is assumed that a first terminal, a second terminal, and a third terminal respectively retain a first, a second, and a third sub-data.

In this case, in each cluster, each of terminals other than the first, the second, and the third terminals accesses the first, the second, and the third terminals and acquires the first, the second, and the third sub-data. The first, the second, and the third terminals mutually transfer the sub-data thereamong to compensate for the missing sub-data. In this manner, all the terminals in the cluster acquire all the data correlated with the geographical area.

When 50 terminals simultaneously download data of 100 [Mbit] without configuring any cluster as in the specific example, each of the terminals download the data each taking a time period of 100 [sec] and therefore, efficiency drop. The number of terminals capable of securing the maximal effective band is 20 and therefore, it can be considered that the data of 100 [Mbit] is divided into 20 5-Mbit sub-data. However, when the data is divided into a size that is too small, the overhead to access the remote file is increased, causing a bottleneck and therefore, the demand of the overall system may not be satisfied.

According to the second embodiment, the data correlated with the geographical area is divided by the division number into sub-data each having a size capable of being downloaded at the maximal effective speed; and in each cluster, the terminals of the division number each download the sub-data from the service server via the base station. Therefore, each terminal can download at the maximal effective speed. In the cluster, the terminals mutually transfer thereamong the sub-data retained thereby and thereby, all the terminals can acquire all the necessary data.

An effect is achieved that plural data processing apparatuses can acquire all necessary data.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing method that is executed by a first data processing apparatus, the data processing method comprising:
setting, based on a size of data for executing a predetermined function, a first division number for dividing the data;
producing X groups wherein the X is included in a pair selected from among a plurality of pairs of X and N obtained by dividing the first division number, where X and N are positive integers;
assigning to the X groups, data processing apparatuses, each capable of communicating with the first data processing apparatus; and
assigning to the X groups, X sub-data portions formed by dividing the data, respectively, such that in each group, the sub-data portions assigned to each group is divided into N sub-data portions and assigned to N data processing apparatuses, respectively, wherein the N data processing apparatuses are selected from among data processing apparatuses assigned to the group, wherein the pair is selected from among the pairs based on at least one element among a time period to download the data from the first data processing apparatus, an effective maximal speed to download the data, a time period consumed for communication between areas each having the processing apparatus located therein, and a time period consumed to access a file of the first data processing apparatus.

2. The data processing method according to claim 1, further comprising selecting the N data processing apparatuses based on a communication strength thereof.

3. The data processing method according to claim 1, further comprising acquiring the sub-data portions from at least one of the data processing apparatuses among the N data processing apparatuses by data processing apparatuses included among the data processing apparatuses assigned to each of the groups of the second division number and excluding the N data processing apparatuses.

4. The data processing method according to claim 1, wherein the data processing apparatuses assigned to each of the groups of the second division number are located in one among a plurality of areas.

5. The data processing method according to claim 4, wherein the assigning of the sub-data portions in a case where a fourth data processing apparatus among the N data processing apparatuses of at least one group of the groups of the second division number ceases to be located in the area, when the fourth data processing apparatus is downloading the sub-data portions from the first data processing apparatus and the downloading comes to an end, includes assigning the sub-data portions assigned to the fourth data processing apparatus, to a fifth data processing apparatus that is included in the at least one group and is other than the N data processing apparatuses.

6. The data processing method according to claim 4, further comprising notifying a seventh data processing apparatus of information concerning the N data processing apparatuses of a group located in a new area, when the seventh data processing apparatus, which is other than the N data processing apparatuses of at least one group of the groups of the second division number, moves from the area to the new area.

7. The data processing method according to claim 1, wherein the assigning of the sub-data portions includes when communication varies to weaken between the first data processing apparatus and a second data processing apparatus among the N data processing apparatuses of at least one group of the groups of the second division number, assigning the sub-data portions assigned to the second data processing apparatus, to a third data processing apparatus that is included in the at least one group and is other than the N data processing apparatuses.

* * * * *